R. BURDINE.
ROTARY PUMP.
No. 10,822.  Patented Apr. 25, 1854.
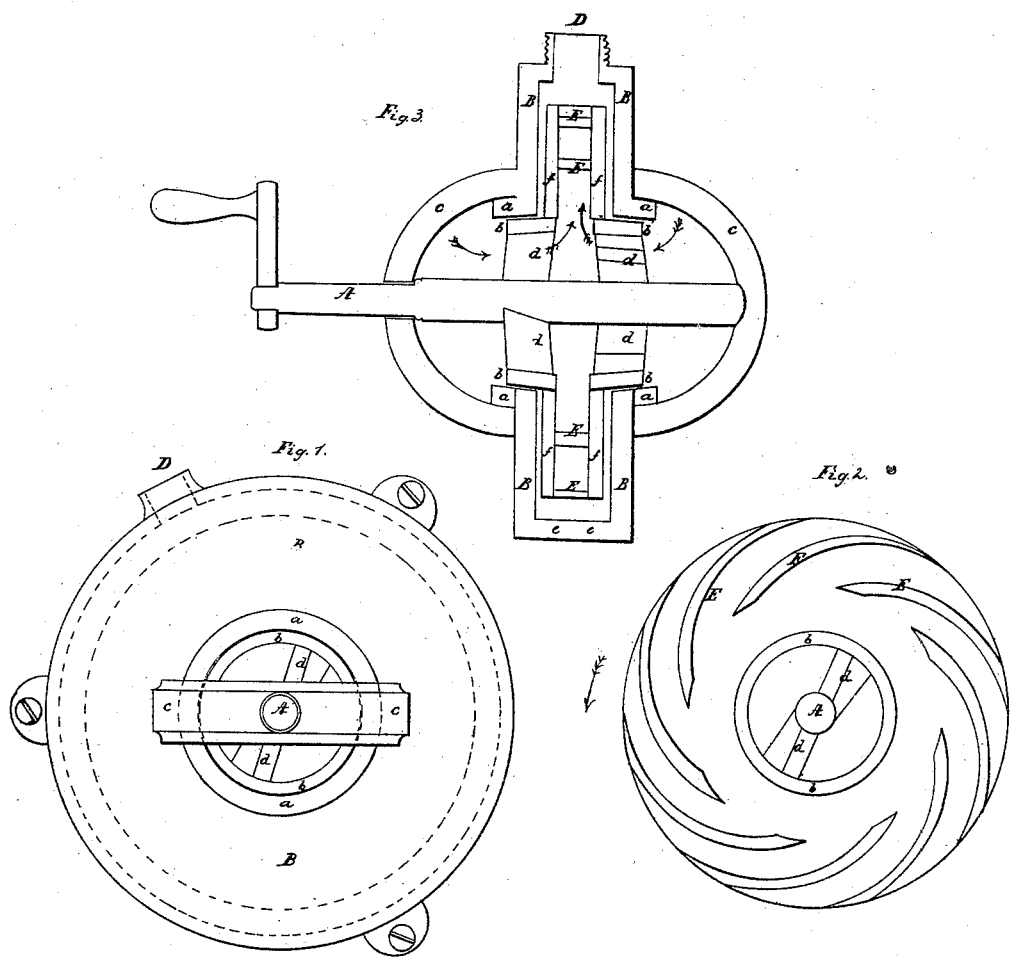

UNITED STATES PATENT OFFICE.

R. BURDINE, OF WASHINGTON, DISTRICT OF COLUMBIA.

ROTARY PUMP.

Specification of Letters Patent No. 10,822, dated April 25, 1854.

*To all whom it may concern:*

Be it known that I, REUBIN BURDINE, of the city of Washington and the District of Columbia, have invented a new and useful Improvement in Counterbalanced Rotary Pumps, and that the following is a full, clear, and exact description of the same, reference being had to the accompanying drawings, making a part of this specification, of which—

Figure 1, is an exterior view of the case or drum containing the driver; Fig. 2, a bird eye view of the driver having one of its sides removed; Fig. 3, a central section of the apparatus with the driver in its place.

The nature of my invention consists in so combining the action of the screw for delivery of the water into the case or drum, with the revolving arms or ribs formed of involutes of a circle, that by the combined action or effect of these mechanical devices I am enabled to elevate water at a greatly reduced expenditure of power. The principle of its construction is exceedingly simple, and its operation may be more readily appreciated, when it is explained, that the water received in the drum or case containing the driver may be considered as a constantly flowing nut of water which meeting with a corresponding nut entering the opposite side of the case; the two screw nuts at their junction have a tendency to flatten the screw columns and therefore readily fill the drum and present the water in the best form to be acted or operated on by the ribs of the driver, this hydraulion being constructed so as to require neither packing or close fitting in any part thereof (as it depends entirely on water packing) a vast amount of the friction of other pumps is avoided.

In the accompanying drawings, A represents the driving shaft to which the power is applied; B, B, the casing, consisting of flat disks of metal having a raised rim or flange $e, e$, thus forming a drum.

C, C, are semicircular bridles, serving as journals for the axis or shaft A.

$a\ a, a\ a$, are raised borders circumscribing the openings of each side of the disks, or inlets for the water.

D, is the exit or discharge pipe.

$b\ b, b\ b$, are annular rings bordering the screws $d\ d, d\ d$, secured on the shaft A.

$f\ f$, Fig. 3, represents the sides of the driver also united with the screws $d\ d, d\ d$, shaft, &c., turning with A.

E E E are volutes of a circle serving as vanes interposed between the sides or plates of the driver, it will be noticed at the periphery of $f\ f$, they follow the same for a short distance, so as partially to contract the space thereat. Between $b\ b$ of the driver is an open space with the exception of the axis and partial screws for the reception of the water. The screws are placed counter to each other, that is, although on opposite sides of the drum, they direct the water inward.

The principle of the operation of the hydraulion has already been partially explained, and it only remains to add that the pump having been immersed below the water, it flows or enters in the direction of the dart in Fig. 3 into the space between the screws $d\ d, d\ d$, and fills it, then the curved wings are driven in the direction of the arrow, with their ends entering and passing through the flowing water as above, and serve the partial purpose of directing the water toward the periphery of the driver $f\ f$, the water nuts being continually replaced by others by the screws on the axis, and I would remark (as will be noticed in Fig. 1, where the dotted line indicates the periphery of the driver) that as it does not come near the inside of the case, there is a free space for the water encircling the driver which supplies all the purpose of packing or valves. And as before observed there is no tight or accurate fitting of any of the parts, neither is there a valve at all used, a consequent reduction of friction is the result, indeed with the exception of the flow of water there is none, and as the pressure of water is equal on all sides, the driver is counterbalanced.

Having described the nature of my counter balanced improved rotary pump, what I claim as my invention and desire to secure by Letters Patent is, The combination of the screw or screws upon the rotary shaft A, with the radial curved wings or drivers E E (although I do not confine myself to the curved form as straight ones may be used)—the whole contained within a case or drum for receiving and directing the water intended to be elevated, in the manner set forth in the foregoing specification and shown in the accompanying drawings.

In testimony whereof I have signed my name before two subscribing witnesses.

R. BURDINE.

Witnesses:
 JOHN F. CLARK,
 SAML. GRUBB.